United States Patent
Carrasco et al.

(10) Patent No.: US 9,621,000 B2
(45) Date of Patent: Apr. 11, 2017

(54) ROTOR ASSEMBLY WITH PERMANENT MAGNETS AND METHOD OF MANUFACTURE

(71) Applicants: Eduardo Carrasco, Saint Etienne sous Bailleul (FR); Ulrich Schroeder, Mont-Saint-Aignan (FR)

(72) Inventors: Eduardo Carrasco, Saint Etienne sous Bailleul (FR); Ulrich Schroeder, Mont-Saint-Aignan (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 225 days.

(21) Appl. No.: 14/571,563

(22) Filed: Dec. 16, 2014

(65) Prior Publication Data
US 2015/0171675 A1  Jun. 18, 2015

(30) Foreign Application Priority Data
Dec. 18, 2013 (EP) .................................. 13306753

(51) Int. Cl.
*H02K 1/30* (2006.01)
*H02K 1/27* (2006.01)
(Continued)

(52) U.S. Cl.
CPC .............. *H02K 1/274* (2013.01); *H02K 1/278* (2013.01); *H02K 1/28* (2013.01); *H02K 1/30* (2013.01); *H02K 15/00* (2013.01); *H02K 15/03* (2013.01); H02K 2213/03 (2013.01); Y10T 29/49009 (2015.01)

(58) Field of Classification Search
CPC .......... H02K 1/274; H02K 1/278; H02K 1/28; H02K 1/30; H02K 15/00; H02K 15/03
See application file for complete search history.

(56) References Cited

U.S. PATENT DOCUMENTS 5,345,129 A * 9/1994 Molnar .................. H02K 11/40
                                                        310/156.28
5,563,463 A    10/1996 Stark
(Continued)

FOREIGN PATENT DOCUMENTS

EP    0212552 A2    3/1987

*Primary Examiner* — Dang Le
(74) *Attorney, Agent, or Firm* — Bryan Peckjian; SKF USA Inc. Patent Dept.

(57) ABSTRACT

A permanent magnet rotor assembly includes a cylindrically shaped shaft having an outer surface, a plurality of permanent magnets constituting portions of annular segments and an outer retaining cylindrical sleeve surrounding the plurality of permanent magnets. The assembly further includes a cylindrical magnet housing mounted on the cylindrically shaped shaft for supporting the plurality of permanent magnets. The cylindrical magnet housing is formed of a magnetic material. The retaining cylindrical sleeve is preloaded by a resultant interference fit IF2 defined by the following formula $IF2 = -\Phi Y + \sqrt{((\Phi Y + IF1)^2 + \Phi Y^2 - \Phi X^2)}$, where $\Phi Y$ is an external diameter of the plurality of permanent magnets, $\Phi X$ is an internal diameter of the cylindrical magnet housing, and IF1 is a primary interference fit between an external diameter of the cylindrically shaped shaft and the internal diameter of the cylindrical magnet housing.

15 Claims, 2 Drawing Sheets

(51) Int. Cl.
*H02K 15/00* (2006.01)
*H02K 1/28* (2006.01)
*H02K 15/03* (2006.01)

(56) References Cited

U.S. PATENT DOCUMENTS

| | | | |
|---|---|---|---|
| 6,047,461 A | 4/2000 | Miura et al. | |
| 7,872,553 B2 | 1/2011 | Fremerey | |
| 2005/0093391 A1 | 5/2005 | McMullen et al. | |
| 2005/0099079 A1 | 5/2005 | McMullen et al. | |
| 2007/0090907 A1 | 4/2007 | Fremerey | |
| 2009/0261678 A1 | 10/2009 | Sortore et al. | |
| 2010/0019599 A1* | 1/2010 | Saban | H02K 1/02 310/156.12 |
| 2012/0049662 A1* | 3/2012 | Ions | H02K 1/2733 310/43 |
| 2015/0188369 A1* | 7/2015 | Arimatsu | H02K 1/28 310/156.28 |

\* cited by examiner

ROTOR ASSEMBLY WITH PERMANENT MAGNETS AND METHOD OF MANUFACTURE

CROSS REFERENCE TO RELATED APPLICATION

This is a U.S. Non-Provisional Patent Application claiming the benefit of European Patent Application Number EP13306753 filed on Dec. 18, 2013 (18.12.2013), which is incorporated herein by reference in its entirety.

FIELD OF THE INVENTION

The present invention relates to a rotor assembly with permanent magnets and a method of manufacture thereof.

DESCRIPTION OF THE RELATED ART

Permanent magnet rotor assemblies for high-speed permanent magnet motors and generators are disclosed for example in documents U.S. Pat. No. 5,563,463, U.S. Pat. No. 7,872,553 B2, U.S. 2005/0093391 A1, U.S. 2005/0099079 A1 and U.S. 2009/0261678 A1.

On high speed rotors with permanent magnets, it is necessary to maintain the magnets stuck to the shaft in order to transmit the torque coming from the motor through the magnets. At high speed the centrifugal force becomes too high for regular bonding glues.

It has therefore been proposed to use a sleeve or thin-walled retaining shell which has been stretched around the core and magnets to hold the magnets in position.

In principle to maintain the magnets attached to the rotor with a sleeve, a preload equivalent to the centrifugal force needs to be applied, the limits being given by the mechanical resistance of the sleeve and the way the preload is applied.

A first technical problem lies in the fact that for high speed motors the required interference is substantially higher than the clearance which might be obtained by using the thermal expansion of the parts for a sliding fit at high or low temperature, without risking to damage the parts to be assembled.

A second technical problem lies in the fact that a thin sleeve may be destroyed or deformed under permanent state due to very high axial pressure exerted on the sleeve, if such sleeve is inserted by translation upon press insertion.

SUMMARY OF THE INVENTION

The technical problem to be solved is to provide a permanent magnet assembly and a method of manufacture thereof which remedy the above-mentioned problems or drawbacks.

More specifically the invention aims at more precisely applying a preload on a sleeve.

In particular, the invention aims at improving the easiness of a manufacturing process, enabling a lower cost and a high serial manufacturing process.

The invention more specifically relates to a permanent magnet rotor assembly having a longitudinal axis of rotation X'-X, first and second ends and at least two poles, comprising a cylindrically shaped shaft having an outer surface extending in the direction of said longitudinal axis X'-X, a plurality of permanent magnets constituting portions of annular segments and extending in the direction of said longitudinal axis X-X' and an outer retaining cylindrical sleeve surrounding said plurality of permanent magnets, characterized in that it further comprises a cylindrical magnet housing mounted on said cylindrically shaped shaft for supporting said plurality of permanent magnets, said cylindrical magnet housing being formed of a magnetic material and in that the retaining cylindrical sleeve is preloaded by a resultant interference fit IF2 which is defined by the following formula:

$$IF2 = -\Phi Y + \sqrt{((\Phi Y + IF1)^2 + \Phi Y^2 - \Phi X^2)}.$$

where $\Phi Y$ is an external diameter of said plurality of permanent magnets, $\Phi X$ is an internal diameter of said cylindrical magnet housing, and IF1 is a primary interference fit between an external diameter of said cylindrically shaped shaft and said internal diameter of said cylindrical magnet housing.

According to a first embodiment, the cylindrical magnet housing is made of one piece comprising a cylindrical portion and two closing flanges.

According to a second embodiment, the cylindrical magnet housing comprises a central cylindrical portion and two separate closing flanges.

The retaining cylindrical sleeve may be made of a metallic material.

Alternatively, the retaining cylindrical sleeve may be made of a composite material.

More specifically, the retaining cylindrical sleeve made of a non-magnetic composite material may be wound on the assembly comprising the cylindrical magnet housing and the plurality of permanent magnets.

According to an aspect of the invention, the permanent magnets are installed and bound in the cylindrical magnet housing by gluing, molding or pressing.

The invention further relates to a method for making a permanent magnet rotor assembly as defined here-above, comprising the steps of:

forming a cylindrically shaped shaft, forming a cylindrical magnet housing having an inner diameter $\Phi X$ corresponding to an outer diameter of said cylindrically shaped shaft less an interference fit IF1, said cylindrical magnet housing being formed of a magnetic material, installing in said cylindrical magnet housing a plurality of magnetic or magnetizable elements constituting portions of annular segments, bonding said plurality of magnetic or magnetizable elements into said cylindrical magnet housing, and if necessary magnetizing such magnetizable elements to constitute permanent magnets, installing an outer retaining cylindrical sleeve surrounding said plurality of permanent magnets installed into said cylindrical magnet housing, and inserting said cylindrically shaped shaft into the inner diameter of said cylindrical magnet housing whilst preloading said outer retaining cylindrical sleeve by a resultant interference fit IF2 which is defined by the following formula:

$$IF2 = -\Phi Y + \sqrt{((\Phi Y + IF1)^2 + \Phi Y^2 - \Phi X^2)}.$$

where $\Phi Y$ is an external diameter of said plurality of permanent magnets, $\Phi X$ is an internal diameter of said cylindrical magnet housing, and IF1 is a primary interference fit between an external diameter of said cylindrically shaped shaft and said internal diameter of said cylindrical magnet housing.

More specifically, said step of installing in said cylindrical magnet housing a plurality of magnetic or magnetizable elements constituting portions of annular segments comprises machining said magnetic or magnetizable elements and magnetizing said magnetizable elements to constitute permanent magnets.

In such a case, according to a specific embodiment, the outer retaining cylindrical sleeve surrounding said plurality of permanent magnets installed into said cylindrical magnet housing is installed by simple insertion.

According to another specific embodiment, said outer retaining cylindrical sleeve surrounding said plurality of permanent magnets installed into said cylindrical magnet housing is made of composite material and is installed by wounding around said cylindrical magnet housing.

The permanent magnets may be installed and bound in said cylindrical magnet housing by gluing, molding or pressing.

The cylindrical magnet housing may be made of one piece comprising a cylindrical portion and two closing flanges.

Alternatively, the cylindrical magnet housing comprises a central cylindrical portion and two separate closing flanges.

According to a preferred embodiment of the method according to the invention, said permanent magnets are firstly inserted and bounded in the cylindrical magnet housing as non-magnetized elements, then the resultant magnet assembly is machined and said non-magnetized elements are magnetized to constitute operational permanent magnets prior to installation of said sleeve.

DETAILED DESCRIPTION OF THE PRESENT INVENTION

The present invention will be described in connection with preferred embodiments which are given by way of examples.

Figure 1:
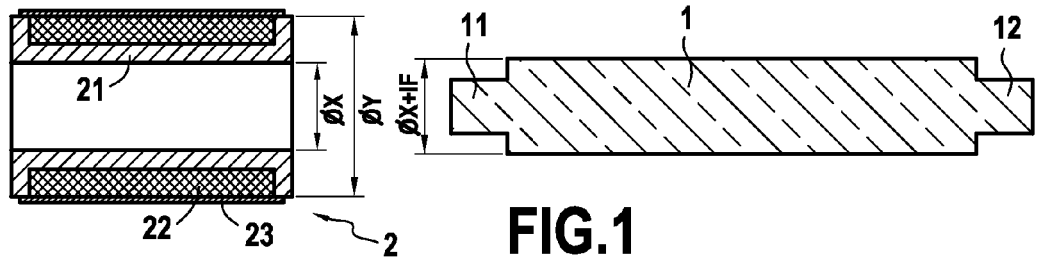
FIG. 1 is a longitudinal sectional view of components of a rotor assembly according to a first embodiment of the invention according to a first step of the manufacturing process.
Figure 3:
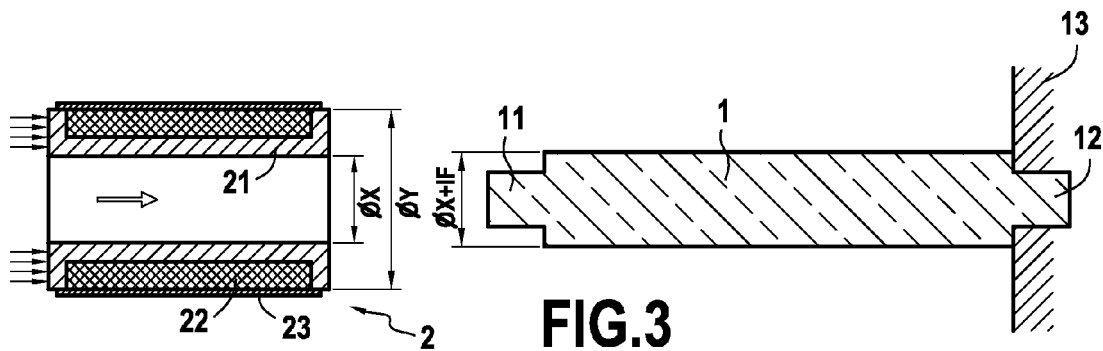
FIG. 3 is a longitudinal sectional view of components of a rotor assembly according to the first embodiment of the invention according to a second step of the manufacturing process.
Figure 5:
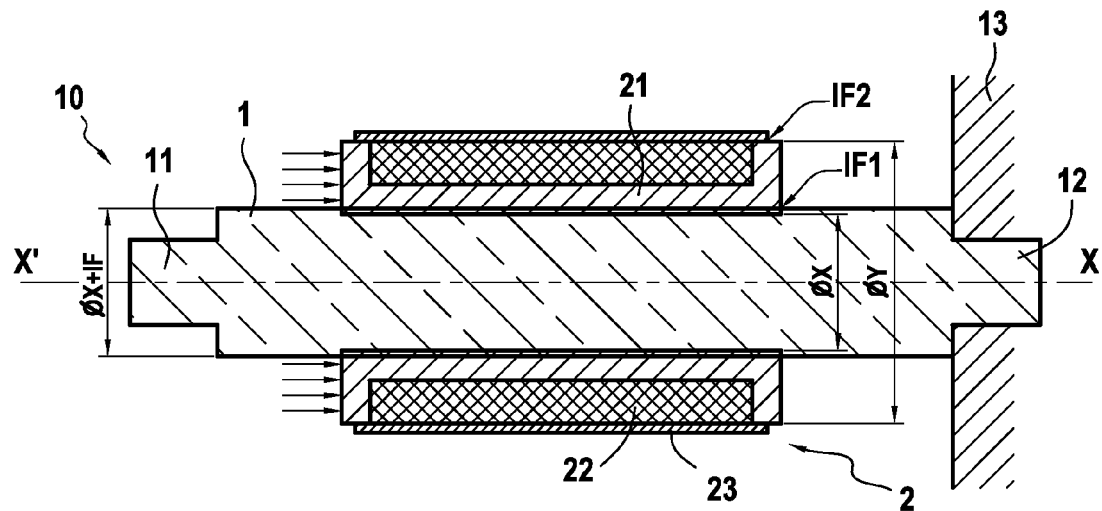
FIG. 5 is a longitudinal sectional view of components of a rotor assembly according to the first embodiment of the invention according to a final step of the manufacturing process.

A typical arrangement of a first embodiment of the invention is illustrated in FIGS. 1, 3 and 5.

As shown in FIG. 1, in order to constitute a permanent magnet rotor assembly having at least two poles, a cylindrically shaped shaft 1 having a longitudinal axis of rotation is prepared. The shaft 1 has an outer surface extending in the direction of the longitudinal axis and presents first and second ends 11, 12 having a reduced section.

FIG. 1 further shows a plurality of elements to be magnetized 22 to become permanent magnets or a plurality of already existing permanent magnets 22. The elements to be magnetized or permanent magnets 22 constitute portions of annular segments and are mounted in a cylindrical magnet housing 21 being formed of a magnetic material and having an inner diameter $\Phi X$ corresponding to an outer diameter of the cylindrically shaped shaft 1 less an interference fit IF1. The outer diameter of the cylindrically shaped shaft 1 is thus equal to $\Phi X + IF1$.

The plurality of permanent magnets or elements to be magnetized 22 are bonded into the cylindrical magnet housing 21 which may be made of one piece comprising a cylindrical portion and two closing flanges. The permanent magnets or elements to be magnetized 22 may be installed into the housing 21 by gluing, molding, pressing or any other method that allows the elements or magnets 22 to be bonded into the housing 21.

If elements to be magnetized 22 are used at this stage, instead of already magnetic permanent magnets, the magnet assembly comprising the housing 21 and the elements 22 and having an outer diameter $\Phi Y$, may be machined at this stage if needed, without the inconvenience of magnetized chips or particles that are likely to stick to any other magnetic material.

Once the magnet assembly comprising the housing 21 and the elements 22 is finished, it may be magnetized for its final function.

An outer retaining cylindrical sleeve 23 is then inserted around the plurality of permanent magnets 22 installed into the cylindrical magnet housing 21.

The next step of a method of manufacturing a rotor motor assembly according to the invention is illustrated in FIG. 3. An end 12 of the shaft 1 is held tight in a fixed frame 13, whereas the other end 11 faces the magnet ring assembly 2 which has been manufactured in the step of FIG. 1 and comprises the permanent magnets 22 located in their housing 21 and retained by the sleeve 23.

The assembly 2 is then moved forward toward the shaft 1 which is inserted into the inner diameter of the cylindrical magnet housing 21, whilst preloading the outer retaining sleeve 23 by a resultant interference fit IF2 which is defined by the following formula:

$$IF2 = -\Phi Y + \sqrt{((\Phi Y + IF1)^2 + \Phi Y^2 - \Phi X^2)}.$$

where $\Phi Y$ is an external diameter of the plurality of permanent magnets 22, $\Phi X$ is an internal diameter of the cylindrical magnet housing 21, and IF1 is a primary interference fit between an external diameter of the cylindrically shaped shaft 1 and the internal diameter of the cylindrical magnet housing 21.

In FIG. 3, the arrows show the direction of application of the force exerted on a flange of the magnet ring assembly 2 to insert it onto the shaft 1.

The required preload on the sleeve 23 depends on the application but may be guaranteed with a high precision by the resultant interference fit given by the above-mentioned formula (1).

FIG. 5 illustrates the resulting rotor assembly 10 with permanent magnets 22 which comprises the magnet ring assembly 2 inserted on the shaft 1 with the primary interference fit IF1 and a resultant interference fit IF2 being shown in the drawing, as well as the longitudinal axis X-X' of the rotor assembly 10.

The two-step process of creating an interference fit according to the invention, including the second step of pushing pre-assembled magnet rings 2 onto a shaft 1, permits to obtain the required high interference without having to apply the excessively high or low temperatures required according to the known methods for assembling permanent magnet rotors of the prior art using the thermal expansion coefficient of the parts for a sliding fit at high or low temperature.

Figure 2:
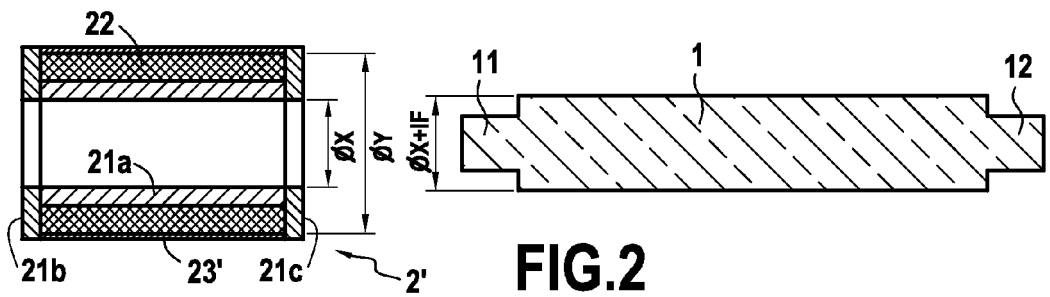
FIG. 2 is a longitudinal sectional view of components of a rotor assembly according to a second embodiment of the invention according to a first step of the manufacturing process.
Figure 4:
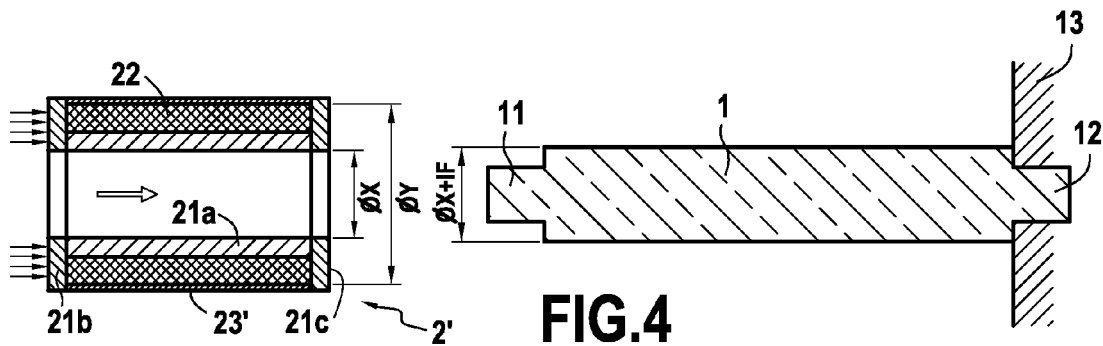
FIG. 4 is a longitudinal sectional view of components of a rotor assembly according to the second embodiment of the invention according to a second step of the manufacturing process.
Figure 6:
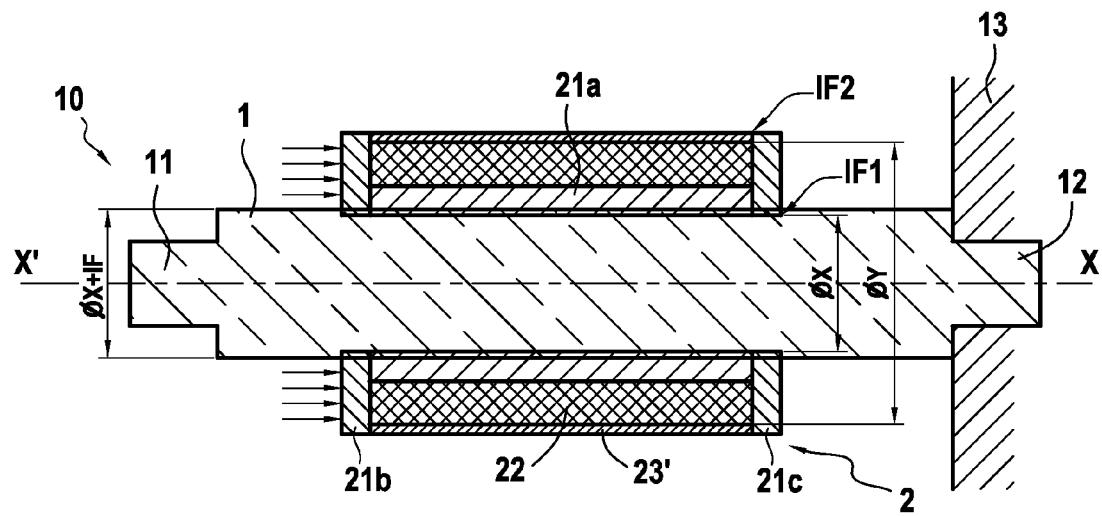
FIG. 6 is a longitudinal sectional view of components of a rotor assembly according to the second embodiment of the invention according to a final step of the manufacturing process.

FIGS. 2, 4 and 6 illustrate a variant embodiment which is generally similar to the embodiment of FIGS. 1, 3 and 5 and will not be described in detail, but which comprises a cylindrical magnet housing 21a, 21b, 21c which comprises a central cylindrical portion 21a and two separate closing flanges 21b, 21c. In the embodiment of FIGS. 2, 4 and 6 the elements which are identical to the elements of the embodiment of FIGS. 1, 3 and 5 bear the same reference numerals and will not be described again.

The central cylindrical portion 21a, like the cylindrical magnet housing 21 is made of magnetic material. The separate closing flanges 21b, 21c can be made either of magnetic material or of non-magnetic material.

In the embodiment of FIGS. 2, 4 and 6, the outer retaining sleeve 23' surrounding the plurality of permanent magnets 22 installed into the cylindrical magnet housing 21a, 21b, 21c may be made of composite material and may be installed by wounding around the cylindrical portion 21a of the cylindrical magnet housing.

The method according to the present invention and the resulting rotor assembly with pre-assembled rings has a number of advantages.

An easy in-situ magnetization of the magnet ring assembly 21, 22 or 21a, 21b, 21c, 22 may be done prior to insertion of the retaining sleeve 23, 23' because the mass of the full shaft 1 is not present, thus facilitating the assembly and machining of magnets 22 that are not yet magnetized. In particular, the risks of damage during transport of the assemblies are reduced because a magnetic field does not exist during the transport and will only be created later on before insertion of a retaining sleeve 23; 23'.

When using the press insertion method as explained above, a sleeve 23, 23' will only receive radial loads, since the force is applied on the surface of the full assembly 2, 2' (e.g. on the flange 21b) which has a bigger surface and is more able to withstand axial efforts.

The present invention allows the manufacturing of the magnets on a different assembly 2, 2' than the shaft 1, so that a complete assembly 2, 2' may be inserted on a shaft 1 and different steps of assembling and machining on the shaft 1 used in the prior art are eliminated, thus reducing the manufacturing cycle time and making a serial production easier.

Finally, the invention permits to precisely apply a preload on the sleeve 23; 23'.

Generally speaking, the invention provides a simplification in the manufacturing process, increases performance and reduces cost.

Although preferred embodiments have been shown and described, it should be understood that any changes and modifications may be made therein without departing from the scope of the invention as defined in the appended claims. Thus the features of the different embodiments may be combined.

The invention claimed is:

1. A permanent magnet rotor assembly having a longitudinal axis of rotation X'-X, first and second ends and at least two poles, comprising a cylindrically shaped shaft having an outer surface extending in the direction of the longitudinal axis X'-X, a plurality of permanent magnets constituting portions of annular segments and extending in the direction of the longitudinal axis X-X' and an outer retaining cylindrical sleeve surrounding the plurality of permanent magnets, comprising:

a cylindrical magnet housing mounted on the cylindrically shaped shaft for supporting the plurality of permanent magnets, the cylindrical magnet housing being formed of a magnetic material and in that the retaining cylindrical sleeve is preloaded by a resultant interference fit IF2 which is defined by the following formula:

$$IF2 = -\Phi Y + \sqrt{((\Phi Y + IF1)^2 + \Phi Y^2 - \Phi X^2)},$$

where $\Phi Y$ is an external diameter of the plurality of permanent magnets, $\Phi X$ is an internal diameter of the cylindrical magnet housing, and IF1 is a primary interference fit between an external diameter of the cylindrically shaped shaft and the internal diameter of the cylindrical magnet housing.

2. The permanent magnet rotor assembly according to claim 1, wherein the cylindrical magnet housing is made of one piece comprising a cylindrical portion and two closing flanges.

3. The permanent magnet rotor assembly according to claim 1, wherein the cylindrical magnet housing comprises a central cylindrical portion and two separate closing flanges.

4. The permanent magnet rotor assembly according to claim 1, wherein the retaining cylindrical sleeve is made of a metallic material.

5. The permanent magnet rotor assembly according to claim 1, wherein the retaining cylindrical sleeve is made of a composite material.

6. The permanent magnet rotor assembly according to claim 5, wherein the retaining cylindrical sleeve made of a composite material is wound on the assembly comprising the cylindrical magnet housing and the plurality of permanent magnets.

7. The permanent magnet rotor assembly according to claim 1, wherein the permanent magnets are installed and bound in the cylindrical magnet housing by one of gluing, molding or pressing.

8. A method for making a permanent magnet rotor assembly, comprising the steps of:

forming a cylindrically shaped shaft, forming a cylindrical magnet housing having an inner diameter $\Phi X$ corresponding to an outer diameter of the cylindrically shaped shaft less an interference fit IF1, the cylindrical magnet housing being formed of a magnetic material, installing in the cylindrical magnet housing a plurality of magnetic or magnetizable elements constituting portions of annular segments, bonding the plurality of magnetic or magnetizable elements into the cylindrical magnet housing, and if necessary magnetizing such magnetizable elements to constitute permanent magnets, installing an outer retaining cylindrical sleeve surrounding the plurality of permanent magnets installed into the cylindrical magnet housing, and inserting the cylindrically shaped shaft into the inner diameter of the cylindrical magnet housing whilst preloading the outer retaining cylindrical sleeve by a resultant interference fit IF2 which is defined by the following formula:

$$IF2 = -\varnothing Y + \sqrt{((\varnothing Y + IF1)^2 + \varnothing Y^2 - \varnothing X^2)},$$

where ΦY is an external diameter of the plurality of permanent magnets,

ΦX is an internal diameter of the cylindrical magnet housing, and IF1 is a primary interference fit between an external diameter of the cylindrically shaped shaft and the internal diameter of the cylindrical magnet housing.

9. The method according to claim 8, wherein the step of installing in the cylindrical magnet housing a plurality of one of magnetic or magnetizable elements constituting portions of annular segments comprises machining the one of magnetic or magnetizable elements and magnetizing the magnetizable elements to constitute permanent magnets.

10. The method according to claim 8, wherein the outer retaining cylindrical sleeve surrounding the plurality of permanent magnets installed into the cylindrical magnet housing is installed by simple insertion.

11. The method according to claim 8, wherein the outer retaining cylindrical sleeve surrounding the plurality of permanent magnets installed into the cylindrical magnet housing is made of composite material and is installed by wounding around the cylindrical magnet housing.

12. The method according to claim 8, wherein the permanent magnets are installed and bound in the cylindrical magnet housing by gluing, molding or pressing.

13. The method according to claim 8, wherein the cylindrical magnet housing is made of one piece comprising a cylindrical portion and two closing flanges.

14. The method according to claim 8, wherein the cylindrical magnet housing comprises a central cylindrical portion and two separate closing flanges.

15. The method according to claim 8, wherein the permanent magnets are firstly inserted and bounded in the cylindrical magnet housing as non-magnetized elements, then the resultant magnet assembly is machined and the non-magnetized elements are magnetized to constitute operational permanent magnets prior to installation of the sleeve.

* * * * *